(12) United States Patent
Ahn et al.

(10) Patent No.: US 9,430,039 B2
(45) Date of Patent: Aug. 30, 2016

(54) APPARATUS FOR CONTROLLING VIRTUAL MOUSE BASED ON HAND MOTION AND METHOD THEREOF

(71) Applicant: Korea Electronics Technology Institute, Seongnam-si, Gyeonggi-do (KR)

(72) Inventors: Yang Keun Ahn, Seoul (KR); Kwang Mo Jung, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 50 days.

(21) Appl. No.: 14/324,447

(22) Filed: Jul. 7, 2014

(65) Prior Publication Data

US 2015/0015490 A1 Jan. 15, 2015

(30) Foreign Application Priority Data

Jul. 15, 2013 (KR) ........................ 10-2013-0082919

(51) Int. Cl.
| | |
|---|---|
| *G06F 3/01* | (2006.01) |
| *G06F 3/03* | (2006.01) |
| *G06F 3/00* | (2006.01) |
| *G01S 17/42* | (2006.01) |
| *G01S 17/89* | (2006.01) |

(52) U.S. Cl.
CPC ............. *G06F 3/011* (2013.01); *G06F 3/017* (2013.01); *G06F 3/0304* (2013.01); *G01S 17/42* (2013.01); *G01S 17/89* (2013.01); *G06F 3/005* (2013.01)

(58) Field of Classification Search
CPC ........ G06F 3/011; G06F 3/017; G06F 3/005; G06F 3/0304; G06F 3/3543; G06K 9/00355; G01S 17/50
See application file for complete search history.

(56) References Cited

U.S. PATENT DOCUMENTS

| | | | | |
|---|---|---|---|---|
| 6,624,833 B1* | 9/2003 | Kumar | ................... | G06F 3/017 345/156 |
| 2008/0089587 A1* | 4/2008 | Kim | ....................... | G06F 3/017 382/190 |
| 2009/0046059 A1* | 2/2009 | Hou | ........................ | G06F 3/014 345/156 |
| 2009/0284469 A1* | 11/2009 | Hsieh | .................... | G06F 1/1626 345/158 |
| 2010/0289740 A1* | 11/2010 | Kim | ........................ | G04G 21/04 345/157 |
| 2012/0113241 A1* | 5/2012 | Sundaresan | ............ | G06F 3/017 348/77 |
| 2012/0235903 A1 | 9/2012 | Im | | |
| 2013/0050076 A1* | 2/2013 | Hong | ..................... | G06F 3/017 345/157 |
| 2013/0241819 A1* | 9/2013 | Yamashita | .............. | G06F 3/017 345/156 |
| 2014/0247964 A1* | 9/2014 | Kurokawa | .............. | G06F 3/005 382/103 |

FOREIGN PATENT DOCUMENTS

KR 10-2007-031292 A 3/2007

OTHER PUBLICATIONS

Ram Rajesh J, et al., "Distance Transform Based Hand Gestures Recognition for Powerpoint Presentation Navigation," Advanced Computing: An International Journal, May 2012, pp. 41-48, vol. 3, No. 3.

* cited by examiner

*Primary Examiner* — Priyank Shah

(57) ABSTRACT

Provided are an apparatus and method for controlling a virtual mouse based on a hand motion. The apparatus includes an image processing unit configured to measure a maximum horizontal width of a hand region of a user and a width of an index finger in any one of a first depth image captured in a state in which the index finger is spread out in a vertical direction with his or her fist and a second depth image captured in a state in which the index finger is folded with the fist, a hand motion recognizing unit configured to compare the maximum horizontal width and the width of the index finger to recognize whether the index finger is folded, and a function matching unit configured to match a change in a folded state of the index finger to a pre-set first function and output a control signal for the function.

11 Claims, 10 Drawing Sheets

APPARATUS FOR CONTROLLING VIRTUAL MOUSE BASED ON HAND MOTION AND METHOD THEREOF

CROSS-REFERENCE TO RELATED APPLICATIONS

This application claims priority under 35 U.S.C. §119 to Korean Patent Application No. 10-2013-0082919, filed on Jul. 15, 2013, the disclosure of which is incorporated herein by reference in its entirety.

TECHNICAL FIELD

The present invention relates to an apparatus providing a user interface or a user experience to a terminal, and more particularly, to an apparatus for recognizing a hand motion of a user using a depth camera and providing a contactless user interface to a terminal based on the recognized hand motion, and a method thereof.

BACKGROUND

The use of electronic devices has been commonplace for decades. In particular, the advancement of electronic technologies has reduced costs for complex and useful electronic device. Cost reduction and consumer demand has spread the use of electronic devices to become ubiquitous de facto in modern society. The prevalence of electronic devices has extended demand for new, enhanced features. Specifically, electronic devices supporting fast, effective, and quality functions are pursued occasionally.

Numerous electronic devices use more than one interface on service. For instance, some computers use keyboards and mouses to obtain user inputs for interactions, while other electronic devices use touch screens and/or touch pads. Many of such interactions require direct physical interactions with hardware pieces. For instance, a user may type on a keyboard to input text or commands. Also, a user may physically move and/or push one or more buttons on a mouse to interact with a computer through the mouse.

In some cases, direct interaction with a hardware piece to provide inputs or commands to a computing device may be inconvenient or may not be optimal. For instance, it may be inconvenient for a user, who provides a projected presentation, to go back to a computer each time an interaction is desired. Also, user carrying an interface device such as a mouse or a wand, while providing the presentation, may be inconvenient in that the user may need to provide inputs by pressing a directional pad or unless the user is familiar to a method of operating an interface device. As discussed over this issue, enhanced systems and methods providing a computing device interface may provide convenience.

SUMMARY

Accordingly, the present invention provides an apparatus and method for recognizing a hand motion of a user using a depth camera and providing a contactless user interface to a terminal based on the recognized hand motion.

The object of the present invention is not limited to the aforesaid, but other objects not described herein will be clearly understood by those skilled in the art from descriptions below.

In one general aspect, an apparatus for controlling a virtual mouse based on a hand motion includes: an image processing unit configured to measure a maximum horizontal width of a hand region of a user and a width of an index finger in any one of a first depth image captured in a state in which the index finger is spread out in a vertical direction with his or her fist and a second depth image captured in a state in which the index finger is folded with the fist; a hand motion recognizing unit configured to compare the maximum horizontal width and the width of the index finger to recognize whether the index finger is folded; and a function matching unit configured to match a change in a folded state of the index finger to a pre-set first function and output a control signal for implementing the matched function.

The image processing unit may detect a hand region of the user using foreground/background separation from the depth image, generate a horizontal histogram from the detected hand region image of the user, and measure a maximum horizontal width at a point having a maximum pixel number.

The image processing unit may detect a hand region of the user using foreground/background separation from the depth image, generate a horizontal histogram from the detected hand region of the user, determine a region of interest by a predefined length specified from an upper end of the horizontal histogram, and determine an average width of the hand region within the region of interest, as a width of the index finger.

The hand motion recognizing unit may compare the width of the index finger with a width corresponding to a predefined percentage of the maximum horizontal width, and when the width of the index finger is less than the width corresponding to the predefined percentage, the hand motion recognizing unit may recognize the index finger in a spread state, and when the width of the index finger is equal to or greater than the width corresponding to the predefined percentage, the hand motion recognizing unit may recognize the index finger in a folded state.

The image processing unit may generate a distance-transformed image in units of pixels with respect to the image of the hand region of the user, and detect a pixel having the greatest value in the distant-transformed image, as a marker.

The hand motion recognizing unit may recognize a change in a position of the user hand using the marker, and the function matching unit may match the change in a position of the user hand to a pre-set second function and output a control signal for implementing the matched function.

The image processing unit may include: a foreground/background separating unit configured to separate a foreground and a background on the basis of the depth information from the depth image; a horizontal hand width measuring unit configured to measure a maximum horizontal width of the hand region image of the user from which the background has been separated; a horizontal index finger width measuring unit configured to measure a horizontal index finger width in the hand region image of the user; and a marker detecting unit configured to detect a marker to be used to recognize a change in a position of the hand from the hand region image of the user.

In another general aspect, a method for controlling a virtual mouse based on a hand motion may include: measuring a maximum horizontal width of a hand region of a user and a width of an index finger in any one of a first depth image captured in a state in which the index finger is spread out in a vertical direction with his or her fist and a second depth image captured in a state in which the index finger is folded with the fist; comparing the maximum horizontal width and the width of the index finger to recognize whether the index finger is folded; and matching a change in a folded state of the index finger to a pre-set first function and outputting a control signal for implementing the matched function.

The measuring of a maximum horizontal width and a width of the index finger may include: detecting a hand region of the user using foreground/background separation from the depth image, generating a horizontal histogram from the detected hand region image of the user, and measuring a maximum horizontal width at a point having a maximum pixel number; and determining a region of interest by a predefined length specified from an upper end of the horizontal histogram, and determining an average width of the hand region within the region of interest, as a width of the index finger.

The measuring of a maximum horizontal width and a width of the index finger may further include: generating a distance-transformed image in units of pixels with respect to the image of the hand region of the user, and detecting a pixel having the greatest value in the distant-transformed image, as a marker.

The recognizing whether the index finger is folded may include: comparing the width of the index finger with a width corresponding to a predefined percentage of the maximum horizontal width; and when the width of the index finger is less than the width corresponding to the predefined percentage, recognizing the index finger in a spread state, and when the width of the index finger is equal to or greater than the width corresponding to the predefined percentage, recognizing the index finger in a folded state.

DETAILED DESCRIPTION OF EMBODIMENTS

Figure 1:
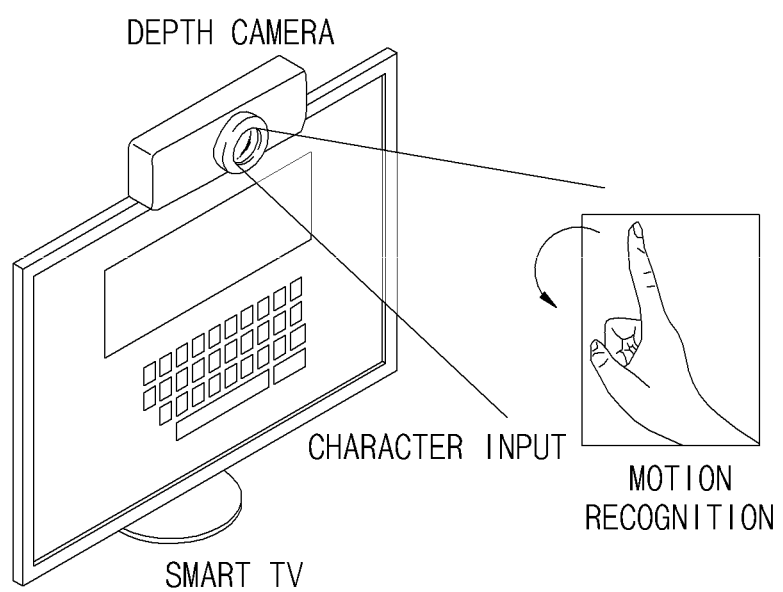
FIG. 1 is a view illustrating a system environment in which an apparatus for controlling a virtual mouse based on a hand motion according to an embodiment of the present invention is provided.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the present invention. The terms of a singular form may include plural forms unless specifically mentioned.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

The term "wireless communication device" used herein is referred to as an electronic device (for example, an access terminal, a client terminal, a client station, or the like) that wirelessly communicates with a base station or another electronic device. The wireless communication device may be referred to as a mobile device, a mobile station, a subscription station, a user equipment (UE), a remote station, an access terminal, a mobile terminal, a terminal, a user terminal, and a subscriber unit. Examples of the wireless communication device include laptop computers (or desktop computers), cellular phones, smartphones, wireless modems, e-readers, tablet devices, and gaming systems. The wireless communication devices may operate according to one or more standards (for example, third-generation partnership project (3GPP), Wi-Max, IEEE 802.11, or Wi-Fi). Therefore, the general term "wireless communication device" may include wireless communication devices (for example, access terminals, UEs, remote terminals, etc.) described by various nomenclatures based on industrial standards.

FIG. 1 is a view illustrating a system environment in which an apparatus for controlling a virtual mouse based on a hand motion according to an embodiment of the present invention is provided.

As illustrated in FIG. 1, an apparatus for controlling a virtual mouse based on a hand motion according to an embodiment of the present invention may be used to control an object in a terminal having a depth camera. For example, a mouse input may be provided such that a user controls a position of a mouse cursor through a hand motion at a distance and clicks the mouse cursor to select or drag an object on a screen of a terminal.

A mouse click event may be determined according to whether one of a thumb, a middle finger, and an index finger is spread out. The spread finger may need to point upwardly so as to be perpendicular to a horizontal axis of an input image.

Figure 2:
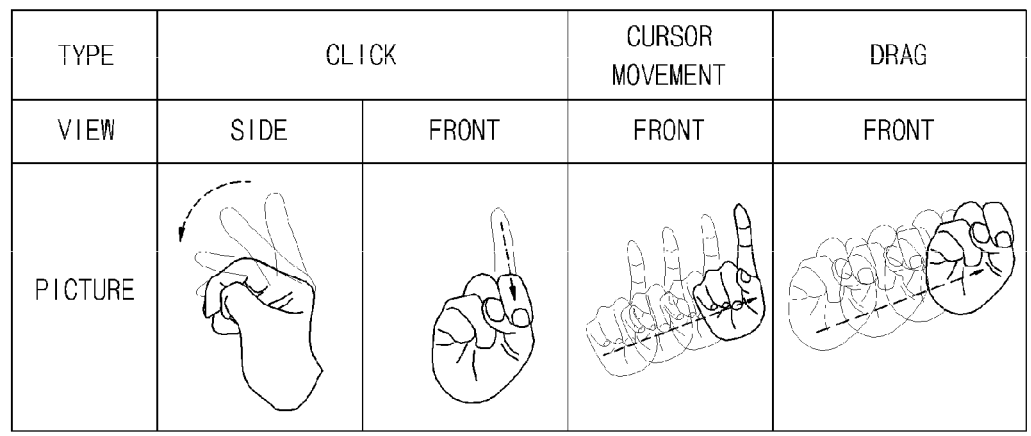
FIG. 2 is a view illustrating an example of virtual mouse functions matched to shapes of hand motions according to an embodiment of the present invention.

FIG. 2 is a view illustrating an example of mouse operations corresponding to hand motions. As illustrated in FIG. 2, a user, making a fist, moves his index finger up and down and a depth camera images the moving fingers to generate depth information data. Here, whether the index finger is spread out may be used as a reference for determining a mouse click event, movement of user's hand with the index finger spread out is used as a reference for determining whether a mouse cursor moves, and movement of the user's hand with the index finger folded is used as a reference for determining whether an object of a terminal is selected and subsequently dragged.

Whether a mouse is clicked is determined by comparing a horizontal width of the hand. By determining whether a mouse is clicked based on morphological analysis, rather than an existing recognition technique using training based on motion recognition, recognition results resistant to an environment may be obtained.

As for movement of a mouse cursor, feature points of a hand are extracted and mapped to a positions of a hand in a space and positions in a virtual space. When a hand moves, an operation of extracting a region of interest, eliminating fingers and a wrist, is performed to extract cursor movement adjustment points resistant to a hand shape.

Figure 3:
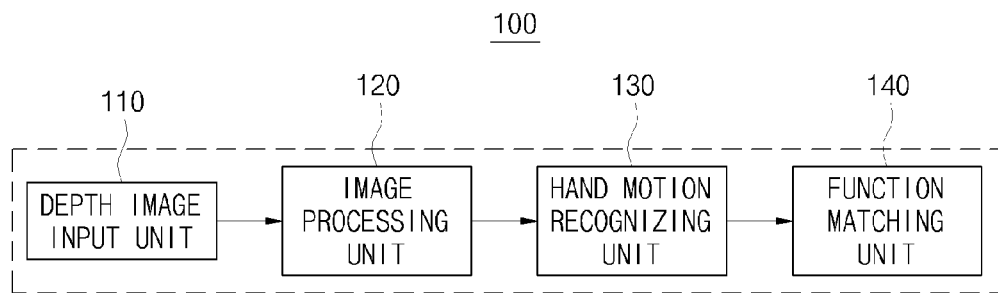
FIG. 3 is a block diagram illustrating the apparatus for controlling a virtual mouse based on a hand motion according to an embodiment of the present invention.

Hereinafter, the apparatus for controlling a virtual mouse based on a hand operation performing the aforementioned functions will be described in detail with reference to FIGS. 3 through 11. FIG. 3 is a block diagram illustrating the apparatus for controlling a virtual mouse based on a hand motion according to an embodiment of the present invention.

Referring to FIG. 33, the apparatus for controlling a virtual mouse based on a hand motion according to an embodiment of the present invention includes a depth image input unit 110, an image processing unit 120, a hand motion recognizing unit 130, and a function matching unit 140.

Image data imaged by a depth camera installed in a terminal is input to the depth image input unit 110. The depth camera generates information regarding a distance to an object within a scene. For example, a camera using a time-of-flight (TOF) technique is a typical depth camera. A depth camera radiates infrared light or an optical signal to a scene, measures a distance using a phase difference over which the signal is returned after being reflected from an object, and outputs a depth image.

The image processing unit 120 processes the depth image input to the depth image input unit 110 to measure a maximum horizontal width of a user hand from the depth image obtained by imaging the user hand and measure a horizontal width of an index finger. Here, the input depth image may be a first image captured in a state in which the index finger with the user fist is spread out in a vertical direction or a second image captured in a state in which the index finger with the fist is folded. The image processing unit 120 may perform processing to measure a maximum horizontal width of the hand and a horizontal width of the index finger on the first image or the second image input in real time.

Figure 4:
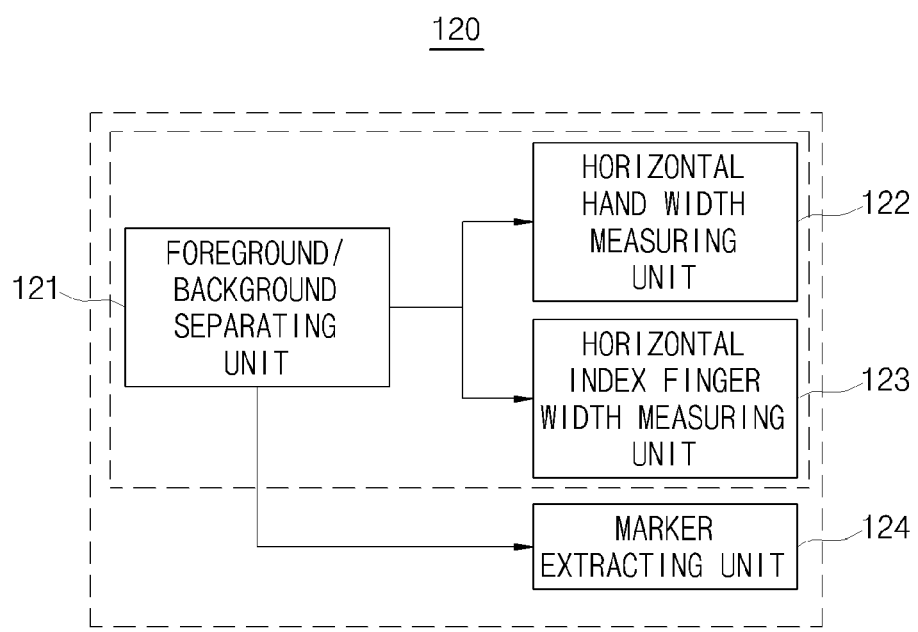
FIG. 4 is a block diagram illustrating an internal configuration an image processing unit of FIG. 3.

Referring to FIG. 4, the image processing unit 120 may include a foreground/background separating unit 121, a horizontal hand width measuring unit 122, and a horizontal index finger width measuring unit 123.

Figure 5:
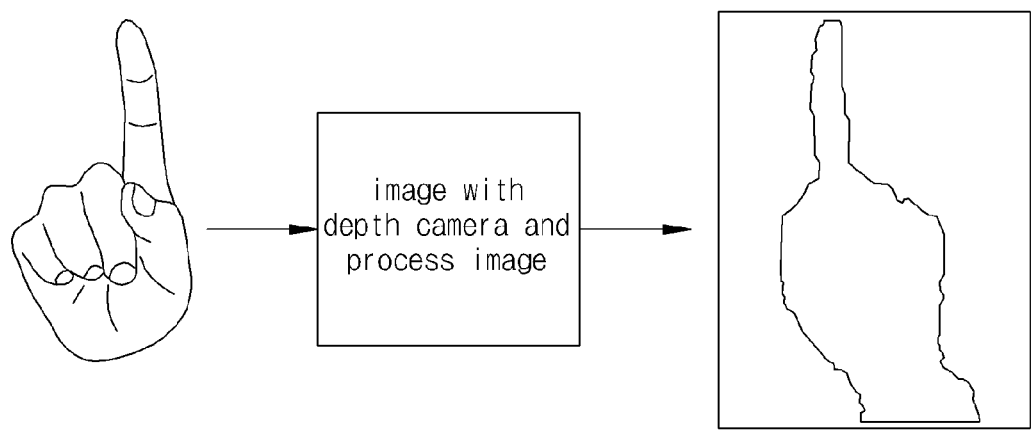
FIG. 5 is a view illustrating results of removing a background image from a depth image according to an embodiment of the present invention.

As illustrated in FIG. 5, the foreground/background separating unit 121 separates an object (foreground) and a background using depth information data by pixel obtained from the image capture by the depth camera. This is to extract a hand region part from the captured depth image. Namely, a region closest to the camera is searched from the depth image, regards a pre-set distance (distance to the camera, for example, 5 cm) in the region, as a hand region and extracts the distance, and binarizes a hand image present in the corresponding distance region by pixel.

The horizontal hand width measuring unit 122 obtains a horizontal histogram from the image of the hand region binarized by pixel by the foreground/background separating unit 121. The horizontal histogram is obtained by adding shade values corresponding to respective coordinates by pixel in the binarized depth image.

Figure 6:
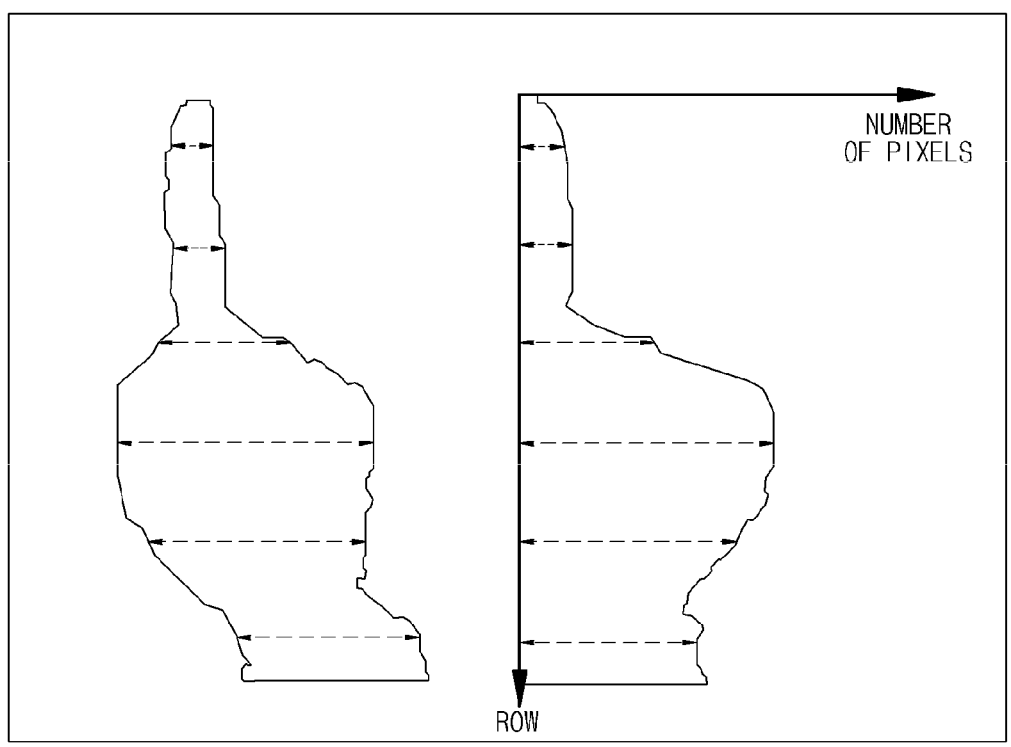
FIG. 6 is a view illustrating the results of generating a horizontal histogram of a hand region to measure a horizontal width of a hand according to an embodiment of the present invention.

FIG. 6 is a view illustrating an example of an image of a hand region from which a horizontal histogram is obtained. As illustrated in FIG. 6, a portion having the largest amount of shade values (pixel values) corresponding to a hand region by the histogram with respect to the image of the hand region.

Figure 7:
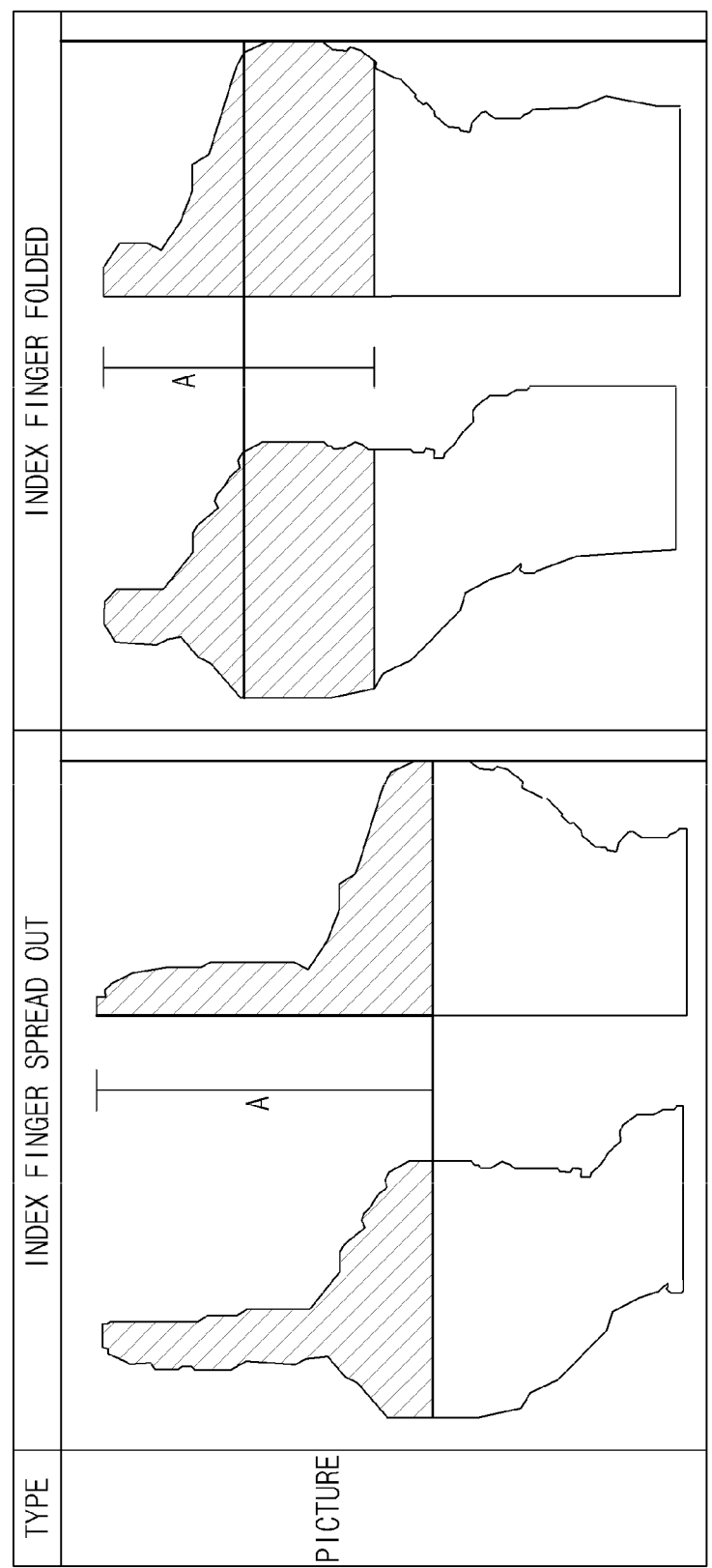
FIG. 7 is a view illustrating a method for measuring a maximum horizontal width of a hand according to an embodiment of the present invention.

FIG. 7 is a view illustrating a method of measuring maximum hand widths and horizontal positions of a first image captured in a state in which an index finger is spread out with a fist and a second image captured in a state in which the index finger is folded with the fist, respectively.

Referring to FIG. 7, the horizontal hand width measuring unit 122 generates horizontal histograms with respect to a first image and a second image and determines predefined distances from upper ends of the generated horizontal histogram images as search regions (for example, regions corresponding to 60% specified from upper ends indicated by region A). Thereafter, the horizontal hand width measuring unit 122 searches the determined search region to measure a maximum hand width in a spot having the largest number of pixels.

Figure 8:
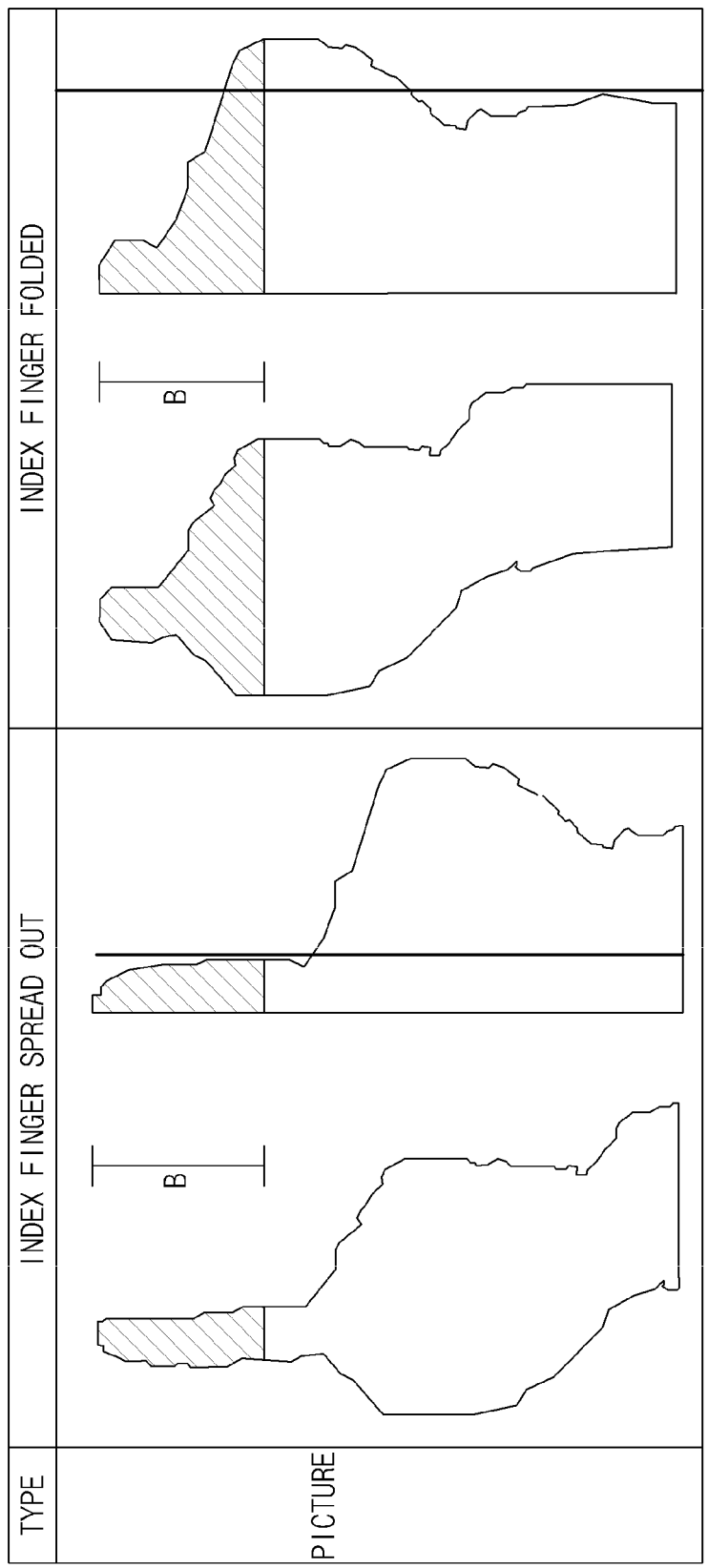
FIG. 8 is a view illustrating a method for measuring a horizontal width of an index finger in an embodiment of the present invention.

FIG. 8 is a view illustrating a method of measuring average widths of index fingers, respectively, of the first image captured in a state in which the index finger is spread out with a fist and a second image captured in a state in which the index finger is folded.

Referring to FIG. 8, the horizontal index finger width measuring unit 123 generates horizontal histograms of first and second images, respectively, and determines predefined distances specified from upper ends of the generated horizontal histograms as regions of interest (for example, regions corresponding to 25% measured from upper ends indicated by region B). Thereafter, the horizontal index finger width measuring unit 123 measures average widths of the regions of interest and determines the measured widths as widths of the hand region.

The image processing unit 120 may further include a marker extracting unit 124 for determining whether the user hand moves.

In controlling a virtual mouse based on a hand motion, a change in a hand motion affects obtaining a mouse cursor movement adjustment point. Thus, a mouse cursor movement adjustment point (marker) resistant to a change in a hand motion needs to be obtained.

To this end, the marker extracting unit 124 first generates a region of interest in which a mouse cursor movement adjustment point is to be obtained, and subsequently extracts a marker for mouse cursor movement adjustment within the region of interest.

Figure 10:
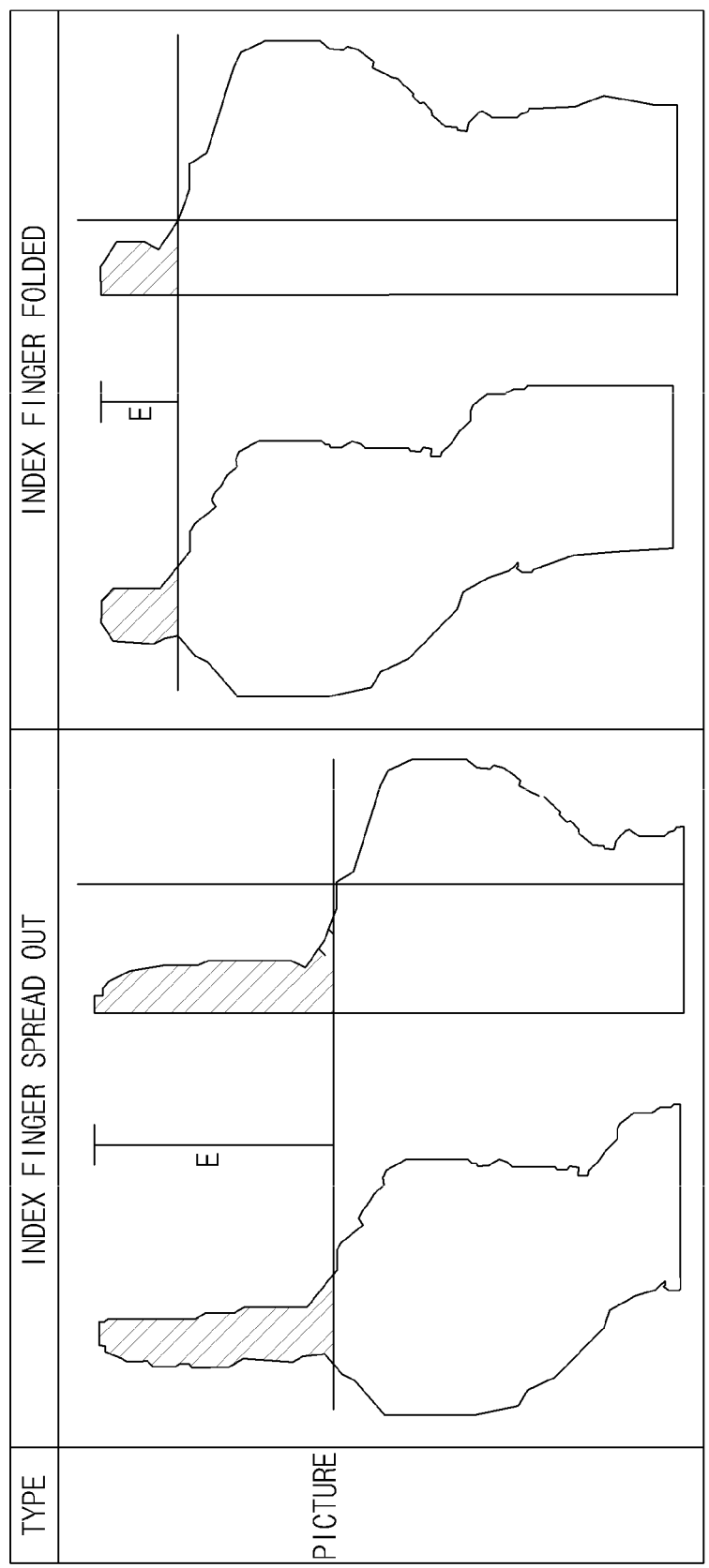
FIG. 10 is a view illustrating results of detecting a lower portion of an index finger region to set a region of interest for detecting a marker in an embodiment of the present invention.

In detail, the marker extracting unit 124 determines a lower end of an index finger in the first image or the second image (the lowermost end of the region E in FIG. 10). The lower end of the index finger may be determined a portion not thicker by 50% than a maximum horizontal width of the hand measured by the horizontal hand width measuring unit 122.

Figure 11:
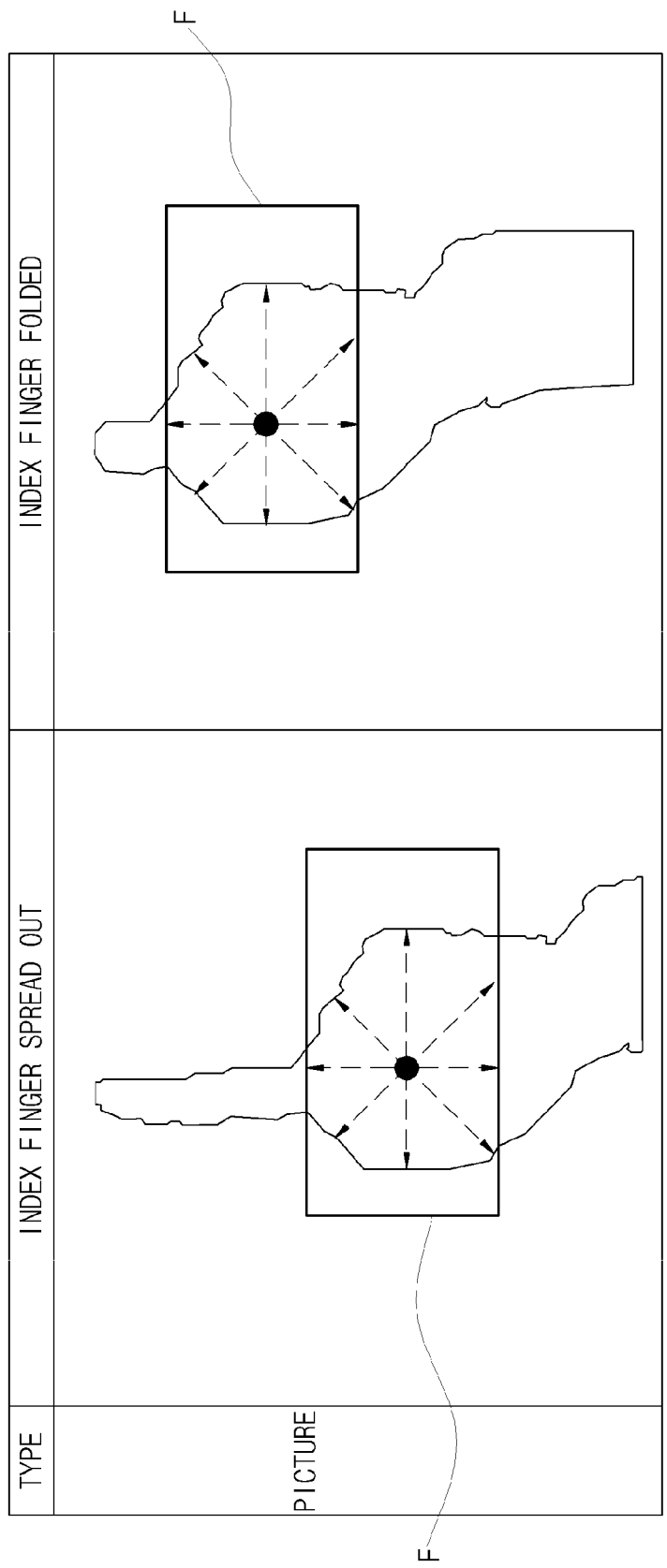
FIG. 11 is a view illustrating a method for detecting a marker in an embodiment of the present invention.

Thereafter, the marker extracting unit 124 determines a region corresponding to 40% of the height of the hand region measured from the determined lower end portion of the index finger, as a region of interest (indicated by the rectangular F in FIG. 11). The image of the hand region within the region of interest is distance-transformed in units of pixels, and a pixel having the greatest value in the resultantly generated distance-transformed image is extracted as a marker.

The distance-transformed image refers to an image obtained by calculating distance values between a closest pixel having a value 0 and each pixel of the original image and using the calculated distance values as respective pixel values. For example, a pixel closest to the original image as a target of distance transformation in the hand region has a value 0, and distance values between the respective pixels and the pixel having the value 0 are calculated. A pixel of the original image closest to the pixel of the value 0 has a pixel value 1, a next pixel has a pixel value 2, and the farthest pixel has a pixel value 3. For example, the center of the hand is positioned to be the farthest from the periphery of the hand, and thus, the pixel having the highest distance value is extracted as the center of the hand and utilized as a marker for controlling movement of a mouse cursor.

The hand motion recognizing unit 130 recognizes whether the index finger has been spread out or has been folded and a change in a position of the marker extracted by the marker extracting unit 124 from the captured image.

In an embodiment, the hand motion recognizing unit 130 determines whether the index finger has been spread out by comparing the maximum horizontal hand width measured by the horizontal hand width measuring unit 122 and the horizontal width of the index finger measured by the horizontal index finger width measuring unit 123.

Figure 9:
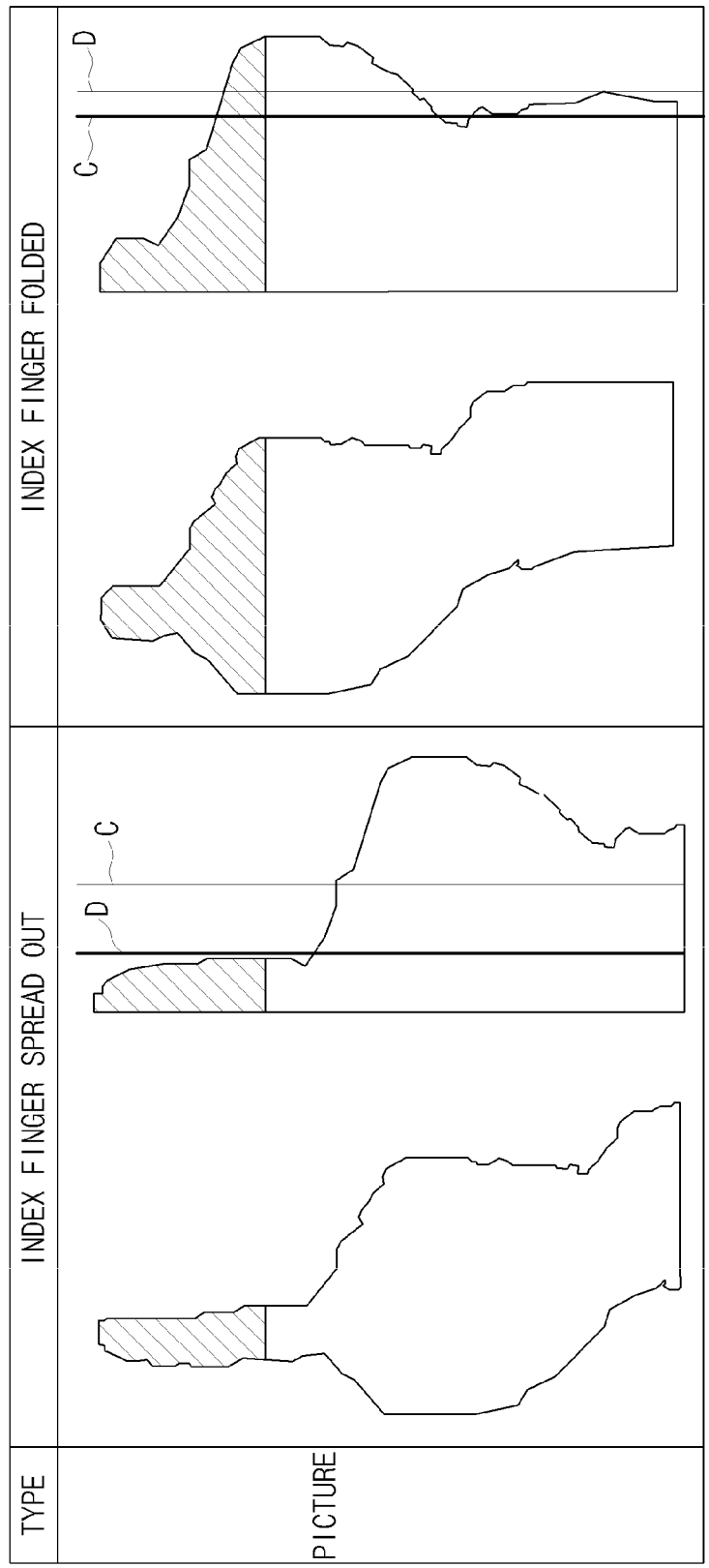
FIG. 9 is a view illustrating a method for determining whether an index finger is folded in an embodiment of the present invention.

In detail, referring to FIG. 9, the hand motion recognizing unit 130 determines whether the index finger has been spread out by comparing a horizontal width of the index finger and a width corresponding to a predefined percentage of the maximum horizontal width of the hand.

In FIG. 9, the line C indicates a point corresponding to 45% of the maximum horizontal width of the hand and the line D indicates a horizontal width of the index finger. It can be recognized that, with the index finger spread out, the width of the index finger (indicated by the line D) is smaller than the reference line (indicated by line C) corresponding to 45% of the maximum width, and with the index finger folded, the width of the index finger is greater than the reference line corresponding to 45% of the maximum width.

In this manner, in the embodiment of the present invention, beyond the technique using training performed to recognize a motion in the related art, recognition results resistant to a surrounding environment may be obtained using the morphological analysis of a hand motion.

The function matching unit 140 matches the spread state of the index finger to a pre-set first function and a change in the position of the marker to a pre-set second function, and outputs a control signal for implementing each of the matched functions.

For example, when a change from the state in which the index finger is spread out to a state in which the index finger is folded is recognized, the function matching unit 140 matches the change to button-down event to select an object of the terminal, and conversely, when a change from a state in which the index finger is folded to a state in which the index finger is spread out is recognized, the function matching unit 140 matches the change to a button-up event.

The function matching unit 140 may match a change in a position of the marker to a change in a position of a mouse pointer.

How specifically the apparatus for controlling a virtual mouse based on a hand motion as described above provides a user interface will be described with reference to FIG. 12.

Figure 12:
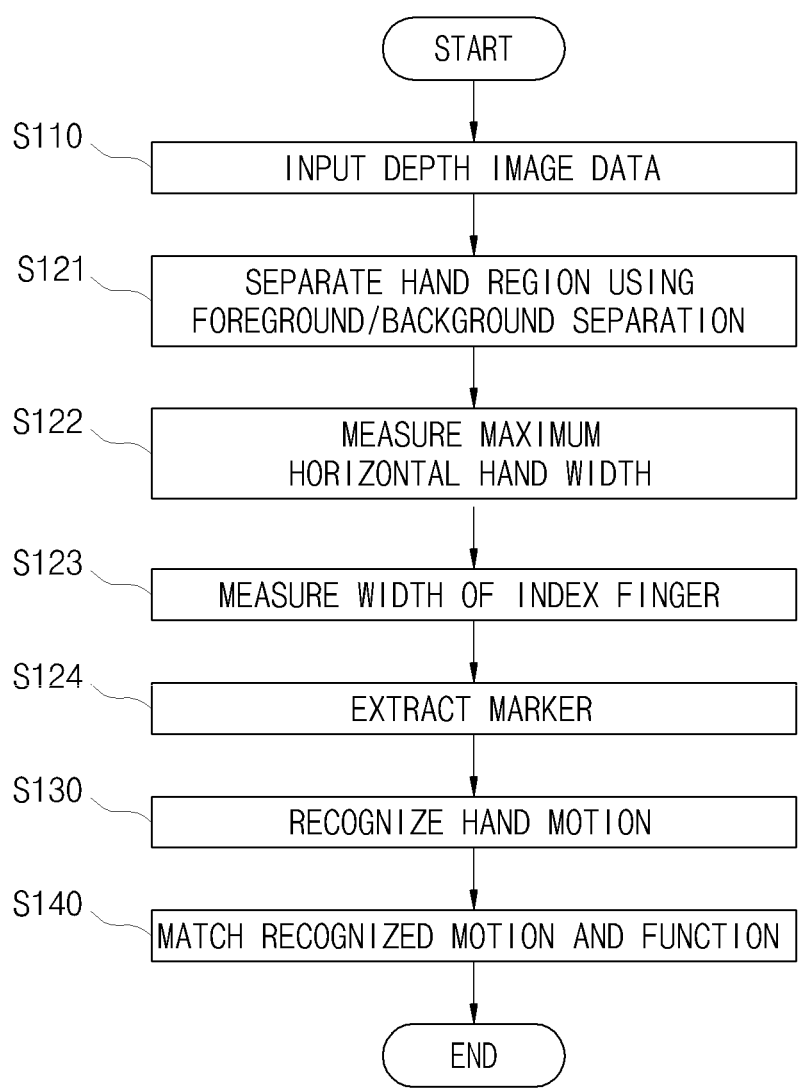
FIG. 12 is a flow chart illustrating a method for controlling a virtual mouse based on a hand motion according to an embodiment of the present invention.

FIG. 12 is a flow chart illustrating a method for controlling a virtual mouse based on a hand motion according to an embodiment of the present invention.

Referring to FIG. 12, a method for controlling a virtual mouse based on a hand motion according to an embodiment of the present invention includes a step (S110 of inputting depth image data, a step (S121) of separating a hand region using foreground/background separation, a step (S122) of measuring a maximum horizontal width in an image of the hand region, a step (S123) of measuring a horizontal width of an index finger in the image of the hand region, a step (124) of detecting a marker from the image of the hand region, a step (S130) of determining whether an index finger is folded by comparing the maximum horizontal width of the hand and the width of the index finger and recognizing a change in a position of the hand using the detected marker, and a step (S140) of matching the recognized hand motion to a function.

Each step for controlling a virtual mouse based on a hand motion has been described above, so a detailed description of the specific method thereof will be omitted.

According to the embodiment of the present invention as described above, even without a control device such as a remote controller, or the like, a user may implement a function with his or her hand motion at a distance, and thus, a financial burden may be lessened and user convenience may be increased.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a virtual mouse based on a hand motion, the apparatus comprising:
an image processing unit configured to measure a maximum horizontal width of a hand region of a user and a width of a finger in any one of a first depth image captured in a state in which the finger is spread out in a vertical direction with his or her fist and a second depth image captured in a state in which the finger is folded with the fist;
a hand motion recognizing unit configured to compare the maximum horizontal width and the width of the finger to recognize whether the finger is folded; and
a function matching unit configured to match a change in a folded state of the finger to a pre-set first function and output a control signal for implementing the pre-set first function,
wherein the image processing unit detects the hand region of the user using foreground/background separation from the first depth image and the second depth image, generates a horizontal histogram from a hand region image of the user, and measures the maximum horizontal width at a point having a maximum pixel number.

2. The apparatus of claim 1, wherein the image processing unit determines a region of interest by a predefined length specified from an upper end of the horizontal histogram, and determines an average width of the hand region within the region of interest, as the width of the finger.

3. The apparatus of claim 1, wherein the hand motion recognizing unit compares the width of the finger with a width corresponding to a predefined percentage of the maximum horizontal width, and when the width of the finger is less than the width corresponding to the predefined percentage, the hand motion recognizing unit recognizes the finger in a spread state, and when the width of the finger is equal to or greater than the width corresponding to the predefined percentage, the hand motion recognizing unit recognizes the finger in the folded state.

4. The apparatus of claim 1, wherein the image processing unit generates a distance-transformed image in units of pixels with respect to an image of the hand region of the user, and detects a pixel having the greatest value in the distant-transformed image, as a marker.

5. The apparatus of claim 4, wherein the hand motion recognizing unit recognizes a change in a position of the hand using the marker, and the function matching unit matches the change in the position of the hand to a pre-set second function and outputs a control signal for implementing the pre-set second function.

6. The apparatus of claim 1, wherein the image processing unit comprises:
   a foreground/background separating unit configured to separate a foreground and a background on the basis of the depth information from the first depth image and the second depth image;
   a horizontal hand width measuring unit configured to measure the maximum horizontal width of the hand region image of the user from which the background has been separated;
   a horizontal finger width measuring unit configured to measure the finger width in the hand region image of the user; and
   a marker detecting unit configured to detect a marker to be used to recognize a change in a position of the hand from the hand region image of the user.

7. A method for controlling a virtual mouse based on a hand motion, the method comprising:
   measuring a maximum horizontal width of a hand region of a user and a width of a finger in any one of a first depth image captured in a state in which the finger is spread out in a vertical direction with his or her fist and a second depth image captured in a state in which the finger is folded with the fist;
   comparing the maximum horizontal width and the width of the finger to recognize whether the finger is folded; and
   matching a change in a folded state of the finger to a pre-set first function and outputting a control signal for implementing the pre-set first function,
   wherein the measuring of the maximum horizontal width and the width of the finger comprises:
   detecting the hand region of the user using foreground/background separation from the first depth image and the second depth image, generating a horizontal histogram from a hand region image of the user, and measuring the maximum horizontal width at a point having a maximum pixel number.

8. The method of claim 7, wherein the measuring of the maximum horizontal width and the width of the finger comprises:
   determining a region of interest by a predefined length specified from an upper end of the horizontal histogram, and determining an average width of the hand region within the region of interest, as the width of the finger.

9. The method of claim 8, further comprising:
   generating a distance-transformed image in units of pixels with respect to the image of the hand region of the user, and detecting a pixel having the greatest value in the distant-transformed image, as a marker.

10. The method of claim 7, wherein the recognizing of whether the finger is folded comprises:
   comparing the width of the finger with a width corresponding to a predefined percentage of the maximum horizontal width; and
   when the width of the finger is less than the width corresponding to the predefined percentage, recognizing the finger in a spread state, and when the width of the finger is equal to or greater than the width corresponding to the predefined percentage, recognizing the finger in the folded state.

11. The method of claim 9 further comprising:
   recognizing a change in a position of the hand using the marker; and
   matching the change in the position of the hand to a pre-set second function and outputs a control signal for implementing the pre-set second function.

* * * * *